US011470018B2

(12) United States Patent
Han et al.

(10) Patent No.: US 11,470,018 B2
(45) Date of Patent: Oct. 11, 2022

(54) SYSTEM-ON-CHIP INCLUDING NETWORK FOR DEBUGGING

(71) Applicant: Electronics and Telecommunications Research Institute, Daejeon (KR)

(72) Inventors: Kyuseung Han, Daejeon (KR); Sukho Lee, Daejeon (KR); Jae-Jin Lee, Daejeon (KR); Sang Pil Kim, Sejong-si (KR); Young Hwan Bae, Daejeon (KR); Kyung Jin Byun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 351 days.

(21) Appl. No.: 16/556,905

(22) Filed: Aug. 30, 2019

(65) Prior Publication Data

US 2020/0092226 A1  Mar. 19, 2020

(30) Foreign Application Priority Data

Sep. 13, 2018 (KR) .................. 10-2018-0109862

(51) Int. Cl.
*H04L 49/109* (2022.01)
*H04L 12/42* (2006.01)
*G06F 11/07* (2006.01)

(52) U.S. Cl.
CPC .......... *H04L 49/109* (2013.01); *H04L 12/42* (2013.01); *G06F 11/0751* (2013.01); *G06F 11/0772* (2013.01)

(58) Field of Classification Search
CPC .... H04L 12/42; H04L 49/109; G06F 11/0772; G06F 11/0751; G06F 30/34; G06F 11/3636; G06F 11/3648; G06F 11/2236; G06F 11/2733; G06F 11/3656; G06F 11/267; G01R 31/31705; G01R 31/318533
See application file for complete search history.

(56) References Cited

U.S. PATENT DOCUMENTS

| 7,526,679 | B2 | 4/2009 | So et al. | |
|---|---|---|---|---|
| 7,941,781 | B1 | 5/2011 | Duan et al. | |
| 8,095,834 | B2* | 1/2012 | Roohparvar | G11C 29/16 365/185.33 |
| 8,296,613 | B2* | 10/2012 | La Fever | G06F 21/10 714/727 |

(Continued)

FOREIGN PATENT DOCUMENTS

| KR | 10-0686182 B1 | 2/2007 |
|---|---|---|
| KR | 100687659 B1 | 2/2007 |

(Continued)

OTHER PUBLICATIONS

Kyuseung Han et al., "A Diagnosable Network-on-Chip for FPGA Verification of Intellectual Properties", IEEE Design & Test, vol. 36, pp. 81-87, Apr. 2019.

*Primary Examiner* — Oussama Roudani
(74) *Attorney, Agent, or Firm* — Rabin & Berdo, P.C.

(57) ABSTRACT

Provided is a system-on-chip. A central controller is configured to, in response to a request from a host, generate a first signal for requesting error information related to an error from a design of an IP. A local controller is configured to generate a second signal including the error information of the target IP if the request from the host is determined to be for the target IP based on the first signal.

9 Claims, 6 Drawing Sheets

(56) References Cited

U.S. PATENT DOCUMENTS

| | | | |
|---|---|---|---|
| 8,764,874 B2* | 7/2014 | Sarta | G06F 13/14 |
| | | | 71/51 |
| 9,632,895 B2 | 4/2017 | Menon et al. | |
| 9,684,578 B2 | 6/2017 | Remple et al. | |
| 10,496,770 B2 | 12/2019 | Kumar et al. | |
| 2007/0147379 A1 | 6/2007 | Lee et al. | |
| 2012/0232825 A1 | 9/2012 | Patil et al. | |
| 2013/0238933 A1 | 9/2013 | Shin | |
| 2014/0126572 A1 | 5/2014 | Hutton et al. | |
| 2015/0242278 A1* | 8/2015 | Cain, III | G06F 12/02 |
| | | | 714/15 |
| 2016/0259756 A1* | 9/2016 | Ahmad | G06F 13/4221 |
| 2019/0303268 A1* | 10/2019 | Ansari | G06F 11/3648 |

FOREIGN PATENT DOCUMENTS

| | | |
|---|---|---|
| KR | 20130126991 A | 11/2013 |
| KR | 20160033695 A | 3/2016 |
| KR | 10-2017-0078662 A | 7/2017 |

* cited by examiner

FIG. 6
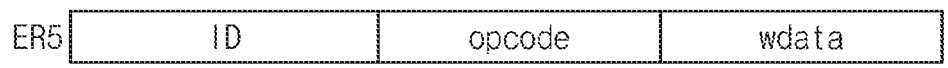

SYSTEM-ON-CHIP INCLUDING NETWORK FOR DEBUGGING

CROSS-REFERENCE TO RELATED APPLICATIONS

This U.S. non-provisional patent application claims priority under 35 U.S.C. § 119 of Korean Patent Application No. 10-2018-0109862, filed on Sep. 13, 2018, the entire contents of which are hereby incorporated by reference.

BACKGROUND

The present disclosure relates to a system-on-chip, and more particularly, to a system-on-chip for debugging.

As the growth of the semiconductor industry and the advancement of semiconductor process technology are made rapidly, the degree of integration of the semiconductor is becoming very high, and the semiconductor system is becoming complicated. As an example, in order to support the various multimedia functions performed by the electronic device, a System on Chip (SoC) may contain millions of integrated logic gates.

The SoC means that a computer system for processing and storing data is implemented using a single semiconductor chip. As an example, the SoC may include a microprocessor, a digital signal processor (DSP), a random access memory (RAM), and a read only memory (ROM). All functions for processing and storing data may be performed within the SoC.

As the degree of integration of the semiconductor chip increases, the time spent for the design and verification of the semiconductor chip is also rapidly increasing. The time spent for design and verification of semiconductor chips accounts for a high percentage of development time for semiconductor chips. Accordingly, in order to quickly and easily design a highly integrated semiconductor chip such as the SoC, there is a demand on a technique for easily debugging an error occurring in the designing process of a semiconductor chip.

SUMMARY

The present disclosure is to provide a system-on-chip including a network for debugging Intellectual Property (IP).

An embodiment of the inventive concept provides a system-on-chip including: a central controller configured to, in response to a request from a host, generate a first signal for requesting error information related to an error from a design of an IP; and a local controller configured to generate a second signal including the error information of the target IP if the request from the host is determined to be for the target IP based on the first signal, wherein the central controller is further configured to transmit the error information of the target IP to the host based on the second signal.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings:

FIG. 6 is a conceptual diagram illustrating example package data represented by the signals of FIG. 4.

DETAILED DESCRIPTION

Figure 1:
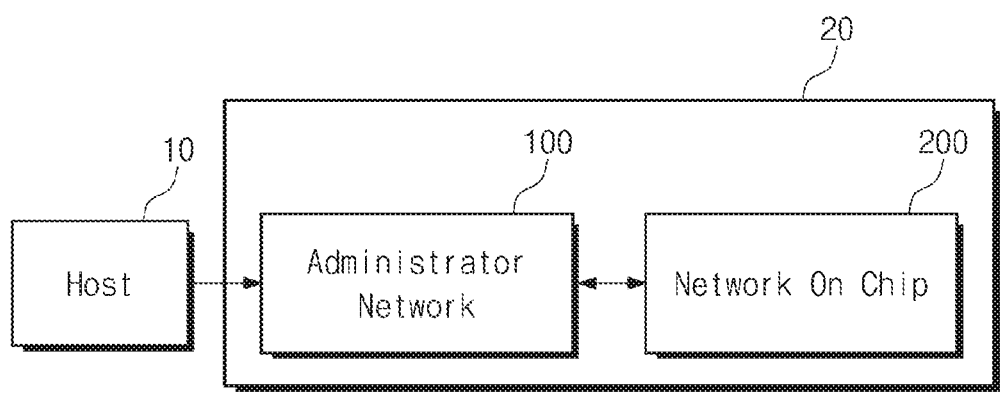
FIG. 1 is a block diagram illustrating a host and a system on chip (SoC) communicating according to an embodiment of the inventive concept.

Hereinafter, embodiments of the inventive concept will be described in more detail with reference to the accompanying drawings. In the description below, details such as detailed configurations and structures are simply provided to help overall understanding. Accordingly, without departing from the technical idea and scope of the inventive concept, modifications on embodiments described in this specification may be performed by those skilled in the art. Furthermore, descriptions of well-known functions and structures are omitted for clarity and conciseness. The terms used herein are defined in consideration of functions of the inventive concept and are not limited to specific functions. The definition of terms may be determined based on the details in description.

Circuits in drawings or detailed description below may be shown in the drawings or may be connected to another component other than components described in detailed description. Each of connections between circuits or components may be direct or indirect. Each of connections between components may be a connection by communication or a physical access.

Unless otherwise defined, all terms including technical or scientific meanings used in the specification have meanings understood by those skilled in the art. In general, the terms defined in the dictionary are interpreted to have the same meanings as contextual meanings and unless they are clearly defined in the specification, are not to be interpreted to have ideal or excessively formal meanings.

FIG. 1 is a block diagram illustrating a host and a system on chip (SoC) communicating according to an embodiment of the inventive concept.

Referring to FIG. 1, the SoC 20 may include an administrator network 100 and a network on chip (NoC) 200. A host 10 may include at least one of a variety of electronic devices. For example, the host 10 may include at least one of electronic devices such as a personal computer (PC), a workstation, a notebook computer, a mobile device, and the like. Alternatively, the host 10 may be a processor device itself (e.g., a Central Processing Unit (CPU), an Application Processor (AP), etc.) capable of controlling the operations of one or more electronic devices.

As an example, the SoC 20 may be a test chip fabricated to verify the design for fabricating semiconductor chips. As an example, the SoC 20 may be implemented using a dedicated circuit including one or more processor cores, e.g., Field Programmable Gate Arrays (FPGAs) or Application Specific Integrated Circuits (ASICs).

The administrator network 100 may perform debugging for the NoC 200 in response to a request from the host 10.

For example, the administrator network 100 may receive requests from a host through interfaces according to protocol standards such as Background Debug Mode (BDM) and Joint Test Action Group (JTAG).

For example, in the process of designing the NoC 200, various errors may occur due to a designer's mistake or violation of the design rule. Hereinafter, debugging may mean an operation for detecting and recovering an error that may occur in the process of designing a semiconductor chip. Hereinafter, for better understanding, debugging as an operation for detecting and recovering errors of the NoC 200 will be described.

If an error is not detected during debugging and the SoC 20 passes verification, or if the detected error is normally recovered through debugging, the SoC 20 may be fabricated as the final chip to be actually used. Accordingly, debugging may improve the reliability of the SoC 20.

The administrator network 100 may communicate with the NoC 200 to perform debugging for the NoC 200. The NoC 200 may be designed based on various topologies to perform various functions (e.g., processing and storing data, etc.). In this specification, the term "topology" is used. Herein, in some cases, the topology may refer to the structure or shape to which the components are connected. Alternatively, in some cases, the topology may refer to the manner in which the components are connected.

As an example, the NoC 200 may include one or more routers and at least one intellectual property (IP) corresponding to at least one router, respectively. IPs may perform various functions for processing and storing data. Routers may provide the base for communication between IPs. IPs may exchange data processed or data stored by communication through routers.

At least one of the IPs may include a processor for controlling the overall operations of the NoC 200. For example, a processor included in an IP may be implemented using a microprocessor, a general purpose processor, a dedicated processor, or an application processor.

At least one of the IPs may include volatile memory such as Static Random Access Memory (SRAM), Dynamic RAM (DRAM), Synchronous DRAM (SDRAM), and the like and/or nonvolatile memory such as flash memory, Phase-change RAM (PRAM), Magneto-resistive RAM (MRAM), Resistive RAM (ReRAM), Ferro-electric RAM (FRAM), and the like.

Figure 7:
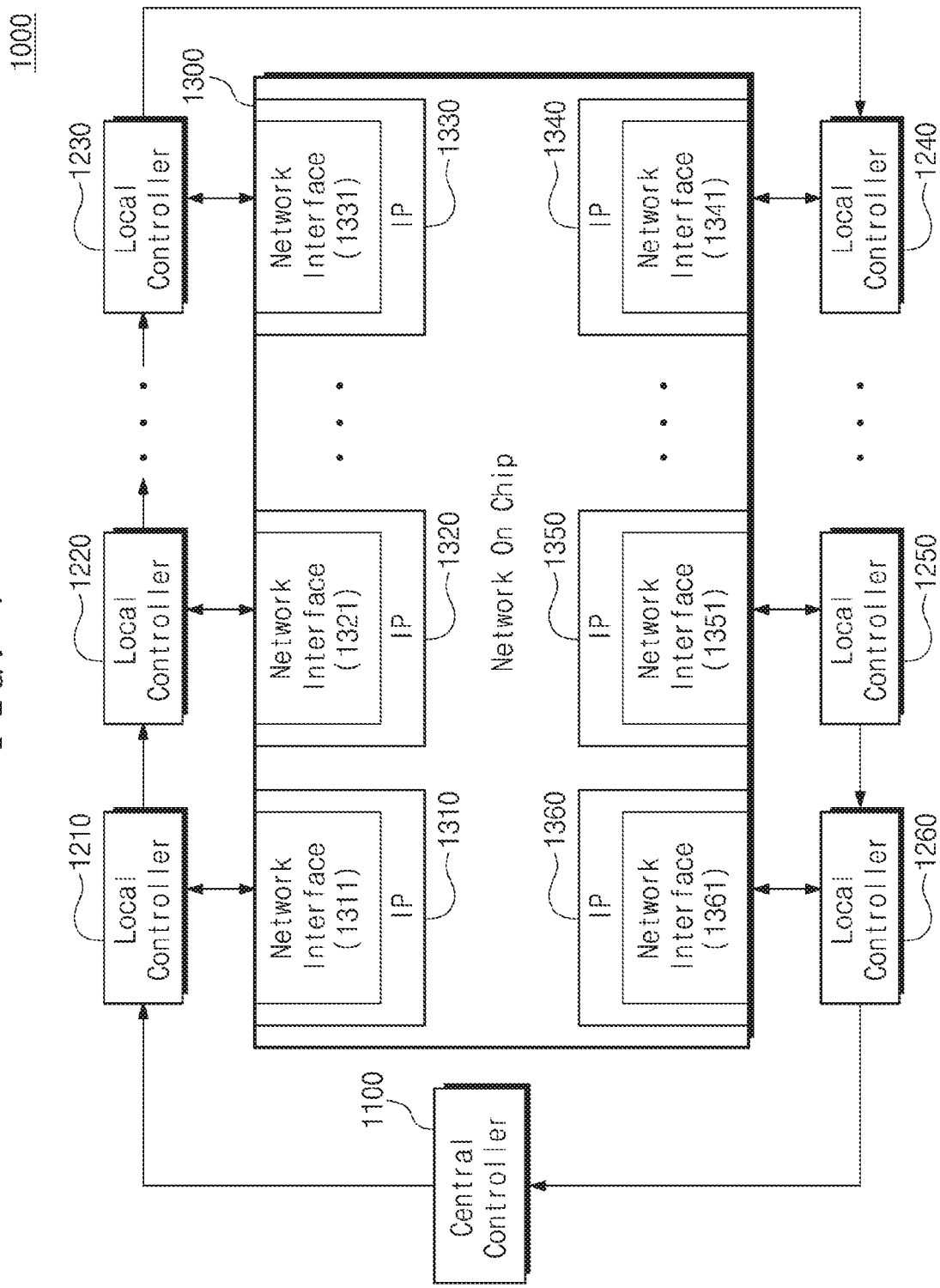
FIG. 7 is a block diagram illustrating the configuration of an SoC according to an embodiment of the inventive concept.

Each of the IPs may communicate with the administrator network 100 through a network interface. Referring to FIG. 7, an example configuration of the NoC 200 will be described in more detail.

Figure 2:
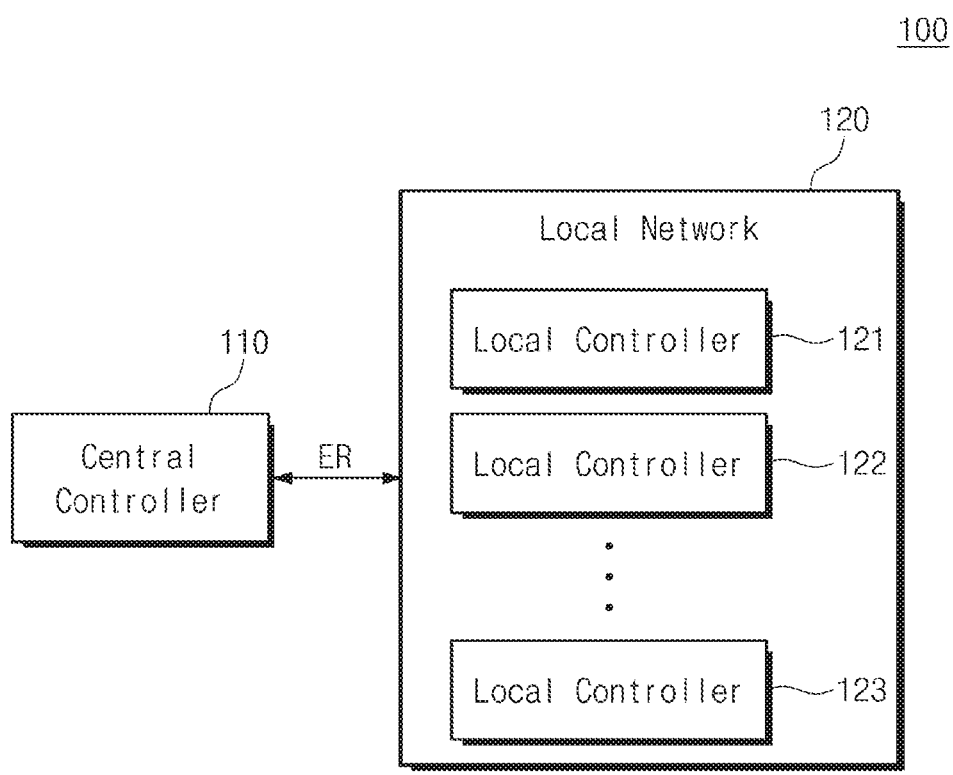
FIGS. 2 and 3 are block diagrams illustrating example configurations of the administrator network of FIG. 1.

FIG. 2 is a block diagram illustrating a specific configuration of the administrator network of FIG. 1.

Referring to FIG. 2, the administrator network 100 may include a central controller 110 and a local network 120. The local network 120 may include local controllers 121 to 123. Each of the central controller 110 and the local controllers 121 to 123 may be an electronic circuit designed for debugging the NoC 200. For example, each of the central controller 110 and the local controllers 121 to 123 may be a hardware module implemented on the FPGA to perform the operations described below. However, the inventive concept is not limited thereto.

Although FIG. 2 illustrates the local network 120 that includes three or more local controllers 121 to 123, it will be understood well that the local network 120 may include one or more local controllers that perform operations similar to the operations of the local controllers 121 to 123.

Figure 4:
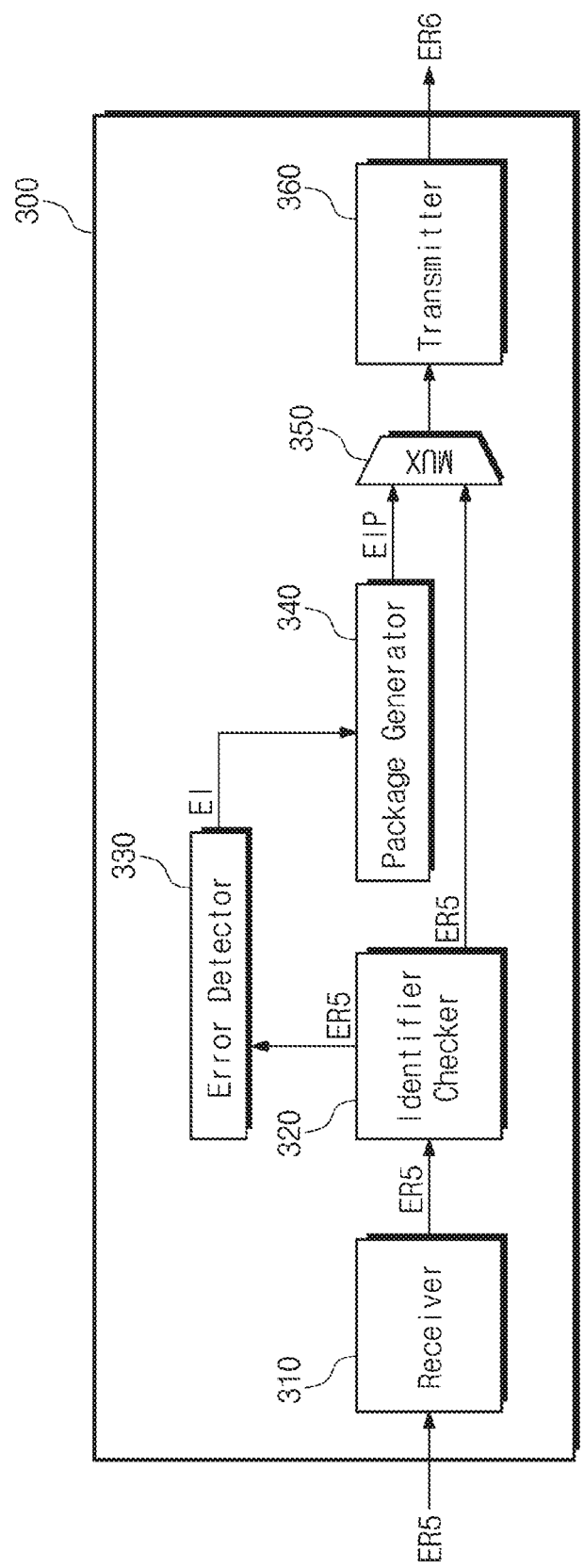
FIG. 4 is a block diagram illustrating an example configuration of a local controller included in the local network of FIGS. 2 and 3.

The local controllers 121 to 123 may store identifiers corresponding to the local controllers 121 to 123, respectively. In this specification, an identifier refers to an indicator such as data, value, number, or information used to uniquely identify each of the local controllers 121 to 123. As an example, the identifier may be n-bit data arbitrarily determined by the designer, and may represent the unique number of the local controller. Referring to FIG. 4, the operations of the local controllers 121 to 123 based on the identifier and the identifier will be described in more detail.

Although not shown in FIG. 2, each of the local controllers 121 to 123 may be connected to at least one IP included in the NoC 200 of FIG. 2. The local controllers 121 to 123 may communicate with the IPs through the network interfaces included in the NoC 200, respectively. Referring to FIG. 7, an example connection relationship between the IPs and the local controllers 121 to 123 included in the NoC 200 will be described in more detail.

The central controller 110 and the local network 120 may exchange data for debugging based on the signal ER. Although the signal ER of FIG. 2 is shown as one signal, the signal ER may include one or more signals between the central controller 110 and the local network 120 for transmitting various data related to debugging.

As an example, the central controller 110 may receive a request for debugging of the NoC 200 from the host 10 in FIG. 1. The central controller 110 may generate a signal ER for controlling at least one of the local controllers 121 to 123 to debug the NoC 200 in response to the received request. The central controller 110 may output the generated signal ER to the local network 120.

The local network 120 may perform debugging based on the signal ER received from the central controller 110. For example, the local controllers 121 to 123 may debug IPs connected to the local controllers 121 to 123 through network interfaces. The local network 120 may output a signal ER indicating information related to errors of the IPs of the NoC 200 to the central controller 110.

Figure 3:
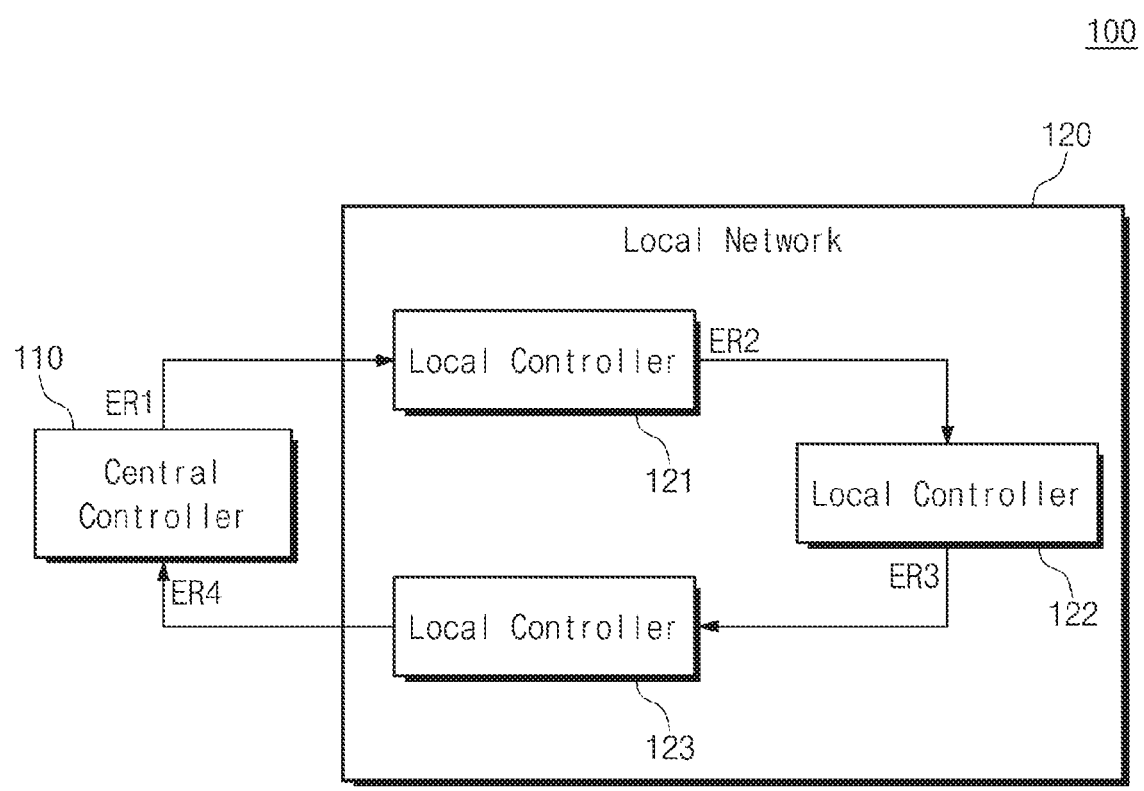

The central controller 110 and the local controllers 121 to 123 may communicate with one another to debug the NoC 200. The central controller 110 and the local controllers 121 to 123 may configure networks based on various topologies for communication. Referring to FIG. 3, an example topology for communication between the central controller 110 and the local controllers 121 to 123 will be described.

FIG. 3 is a block diagram illustrating an example configuration of the administrator network of FIG. 1.

Referring to FIG. 3, the central controller 110 and the local controllers 121 to 123 may constitute a ring topology. The central controller 110 and the local controllers 121 to 123 may perform unidirectional communication.

Although FIG. 3 illustrates a local network 120 that includes three local controllers 121 to 123, it will be understood well that the local network 120 may include one or more local controllers that form a ring topology together with the central controller 110 and perform unidirectional communication.

In the example of FIG. 3, the central controller 110 may output the signal ER1 to the local controller 121. The local controller 121 may output the signal ER2, generated based on the signal ER1, to the local controller 122. The local controller 122 may output the signal ER3, generated based on the signal ER2, to the local controller 123. The local controller 123 may output the signal ER4, generated based on the signal ER3, to the central controller 110. The signal ER in FIG. 2 may include the signals ER1 and ER4 of FIG. 3.

The term error information is used in this specification. The error information means information related to the error of the IP included in the NoC 200. Referring to FIG. 4, example error information will be described in more detail.

The local controller 121 outputs the signal ER2 corresponding to the signal ER1 (e.g., when the signal ER1 is passed through the local controller 121), or outputs the signal ER2 indicating the error information of the IP connected to the local controller 121. The local controller 122 outputs the signal ER3 corresponding to the signal ER2 (e.g., when the signal ER2 is passed through the local controller 122), or outputs the signal ER3 indicating the error information of the IP connected to the local controller 122. The local controller 123 outputs the signal ER4 corresponding to the signal ER3 (e.g., when the signal ER3 is passed through the local controller 123), or outputs the signal ER4 indicating the error information of the IP connected to the local controller 123.

As an example, the host 10 may request the central controller 110 to debug the IP connected to the local controller 121. In response to a request from the host 10, the central controller 110 may output a signal ER1 for controlling the local controller 121. The local controller 121 may determine whether the request from the host 10 is for an IP connected to the local controller 121 based on the identifier included in the signal ER1. The operations of the identifier and the local controller 121 based on the identifier will be described in more detail with reference to FIG. 4.

For example, the local controller 121 may determine that the request from the host 10 indicates debugging for the IP connected to the local controller 121. In this case, the local controller 121 may debug the IP connected to the local controller 121 in response to the signal ER1 depending on the determination result. For example, the local controller 121 may output a signal ER2 indicating error information of the IP connected to the local controller 121.

Then, the local controller 122 may receive the signal ER2. The local controller 122 may determine based on the signal ER2 that the request from the host 10 is not related to debugging for the IP connected to the local controller 122. The local controller 122 may output the signal ER3 by passing the signal ER2 depending on the determination result.

Similarly, the local controller 123 may determine based on the signal ER3 that the request from the host 10 is not related to debugging for the IP connected to the local controller 123. The local controller 123 may output the signal ER4 by passing the signal ER3 depending on the determination result. Accordingly, the signal ER4 received from the central controller 110 may indicate error information of the IP connected to the local controller 121.

The central controller 110 may transmit the error information obtained from the signal ER4 to the host 10. Thereafter, in order to recover the error based on the error information, the host 10 may control the IPs connected to the local controllers 121 to 123 or other electronic circuits that provide signals to those IPs. According to a method similar to the method of debugging the IP corresponding to the local controller 121, the administrator network 100 may debug the IPs corresponding to the local controllers 122 and 123, and thus redundant description will be omitted.

According to the control of the host 10 and/or the central controller 110, debugging for the IPs connected to the local controllers 121, 122, and 123 may be performed sequentially or in parallel. For this, the host 10 and/or the central controller 110 may appropriately schedule the order of debugging and properly control the local controllers 121, 122, 123 so that debugging is performed in the scheduled order.

Although topology and unidirectional communication of a ring structure are described with reference to FIG. 3, the present disclosure is not limited thereto. The configuration of FIG. 3 is provided only for understanding, and the topology of the local network 120 and the communication method of the administrator network 100 may be variously modified or edited depending on the connection method.

Figure 5:
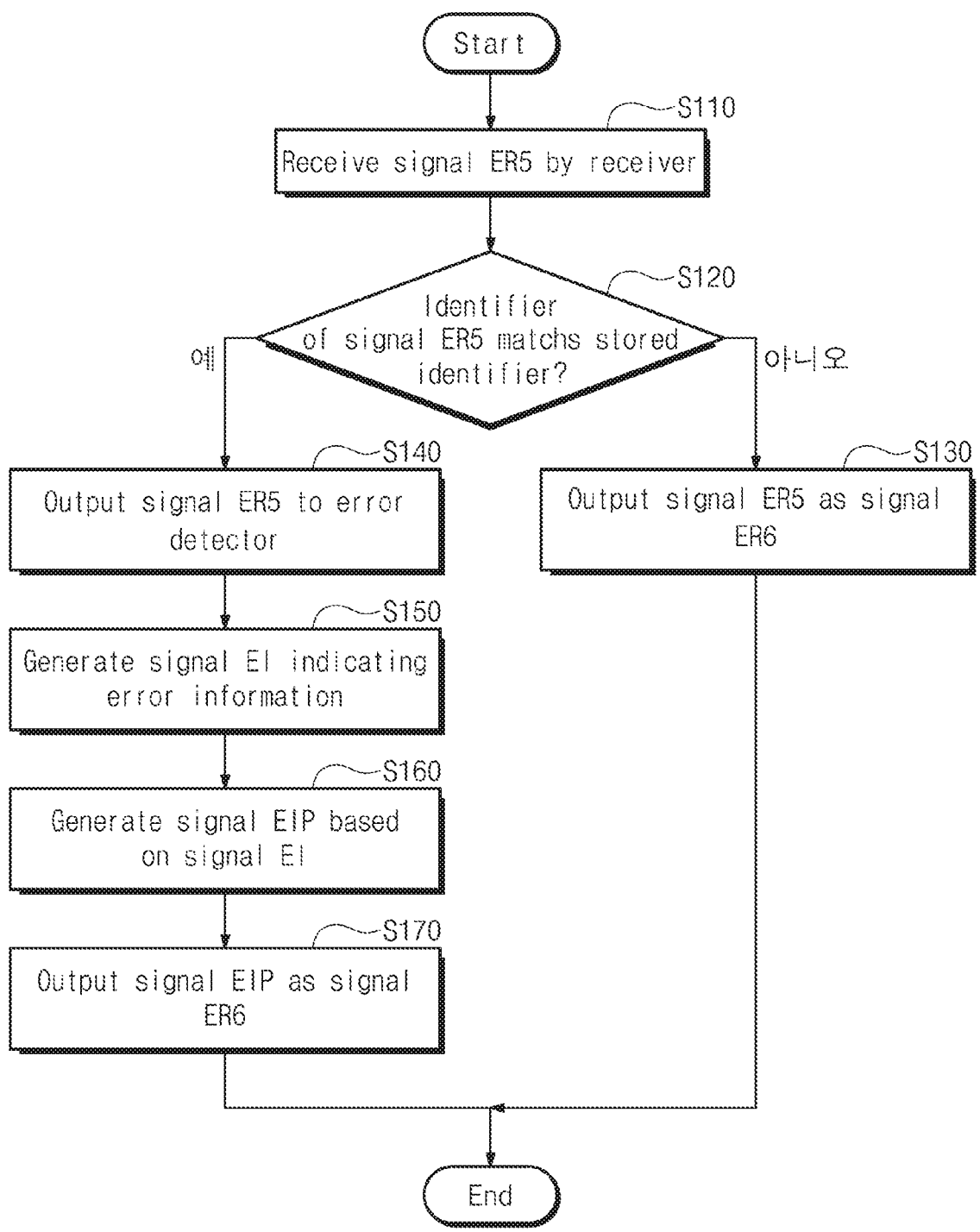
FIG. 5 is a flowchart illustrating the operations of the local controller of FIG. 4.

Referring to FIG. 4, example configurations and operations of the local controllers 121 to 123 will be described in more detail. Referring to FIGS. 4 and 5, the signals ER1 to ER4 will be described in more detail.

FIG. 4 is a block diagram illustrating an example configuration of a local controller included in the local network of FIGS. 2 and 3.

Each of the local controllers 121 to 123 of FIG. 2 may include the local controller 300 of FIG. 4. Referring to FIG. 4, the local controller 300 includes a receiver 310, an Identification checker (ID checker) 320, an error detector 330, a package generator 340, a multiplexer (MUX) 350, and a transmitter 360. In the example of FIG. 4, although an embodiment of the error detector 330 included in the local controller 300 is described, the error detector 330 may be disposed outside the local controller 300. For example, the error detector 330 may be included in a separate electronic circuit external to the SoC 20 of FIG. 2.

The signal ER5 may correspond to one of the signals ER1 to ER3 received by the local controllers 121 to 123 of FIG. 3. The signal ER6 may correspond to one of the signals ER2 to ER4 outputted from the local controllers 121 to 123 of FIG. 3. The signal ER5 may include information of an identifier corresponding to the identifier of one of the local controllers included in the local network 120. For example, the identifier of signal ER5 may match the identifier stored in local controller 300.

The identifier may be related to the request of the host 10. For example, when the host 10 requests error information of an IP connected to the local controller 300, in order to obtain the error information of the IP, the central controller 110 may generate a signal ER5 corresponding to an identifier stored in or assigned to the local controller 300 (or matching an identifier stored or assigned to the local controller 300).

The signal ER5 may contain data for requesting error information of the IPs connected to the local controllers. As an example, the signal ER5 may include data for requesting error information of the IP connected to the local controller 300. The data included in the signal ER5 may be package data. Referring to FIG. 6, example package data will be more specifically described.

The receiver 310 may receive the signal ER5 from the central controller 110 or one of the other local controllers included in the local network 120. The IPs connected to the local controllers may each operate in different clock domains. Thus, the local controllers may each operate in different clock domains.

In order to receive the signal ER5 from another local controller or the central controller 110 operating in a clock domain different from the clock domain of the local controller 300, the receiver 310 may perform asynchronous communication. For example, the receiver 310 may receive the signal ER5 from the central controller 110 or another local controller through communication based on handshaking. The receiver 310 may transmit the received signal ER5 to the ID checker 320.

The ID checker 320 may determine whether or not the identifier included in the signal ER5 is related to the local controller 300. As an example, the ID checker 320 may store an identifier of the local controller 300 or may refer to an identifier assigned to the local controller 300. The ID checker 320 may compare the identifier included in the received signal ER5 with the stored or assigned identifier. As an example, the ID checker 320 may compare the identifier of the signal ER5 with the stored or assigned identifier based on the XOR logical operation or the like.

The ID checker 320 may selectively output the signal ER5 to one of the error detector 330 and the MUX 350 based on the comparison result. Referring to FIG. 5, example operations of the ID checker 320 according to the comparison result will be described in more detail.

The error detector 330 may obtain error information on an IP from the IP (hereinafter referred to as a target IP) connected to the local controller 300. For example, the user may operate the SoC 20 to detect an error in the NoC 200. As the NoC 200 starts to operate, the error detector 330 may monitor the operations of the target IP in real time. If an error occurs in the target IP, the error detector 330 may detect the occurred error and obtain and store error information related to the occurred error.

For example, the error information may relate to whether an error occurs in the target IP and the type of error that occurs in the target IP. For example, the type of error may include functional errors, electrical errors, and the like. The functional error means an error that occurs when the result of the operations of the target IP (i.e., the function of the target IP) is different from the intention of the designer. The electrical error refers to an error that occurs due to a physical problem, such as interference between electrical signals generated within the target IP.

The package generator 340 may generate package data including information obtained by the error detector 330. The package generator 340 may generate a signal EIP indicating package data.

The MUX 350 may selectively transmit one of the signal EIP received from the package generator 340 and the signal ER5 transmitted from the ID checker 320 to the transmitter 360. Referring to FIG. 5, an example method for selectively transmitting one of the signal EIP and the signal ER5 by the MUX 350 will be described in more detail. The transmitter 360 may output the signal EIP and the signal ER5 transmitted from the MUX 350 as the signal ER6.

The transmitter 360 may output the signal ER6 to the central controller 110 or one of the other local networks included in the local network 120. In order to output the signal ER6 to another local controller or the central controller 110 operating in a clock domain different from the clock domain of the local controller 300, the transmitter 360 may perform asynchronous communication. For example, the transmitter 360 may output the signal ER6 to the central controller 110 or another local controller through communication based on handshaking. Referring to FIG. 5, example operations of the local controller 300 according to the transmission of signals will be described in more detail.

FIG. 5 is a flowchart illustrating the operations of the local controller of FIG. 4. Referring to FIG. 4 together with FIG. 5, an example operation of the local controller 300 of FIG. 4 will be described.

In operation S110, the receiver 310 may receive the signal ER5 from the central controller 110 or another local controller. The receiver 310 may output the signal ER5 to the ID checker 320.

In operation S120, the ID checker 320 may receive the signal ER5 from the receiver 310. The ID checker 320 may determine whether or not the identifier included in the signal ER5 matches the identifier of the local controller 300 (i.e., the identifier stored in the ID checker 320). If it is determined that the identifier included in the signal ER5 matches the identifier of the local controller 300, operation S140 may be performed. If it is determined that the identifier included in the signal ER5 does not match the identifier of the local controller 300, operation S130 may be performed.

As described with reference to FIG. 4, the identifier may be related to a request from the host 10. Accordingly, the ID checker 320 may determine whether the request from the host 10 is related to the error information of the IP connected to the local controller 300 by comparing the identifier of the signal ER5 with the stored identifier.

In operation S130, the ID checker 320 may output the signal ER5 to the MUX 350. The MUX 350 may transmit the signal ER5 to the transmitter 360. The transmitter 360 may output the signal ER5 transmitted from the MUX 350 as the signal ER6. As the signal ER5 is outputted as the signal ER6 by the transmitter 360, the local controller 300 may pass the signal ER5. That is, if the identifier of the signal ER5 does not match the identifier stored in the ID checker 320, the local controller 300 may pass the signal ER5 and output the signal ER6 by operation S110 to operation S130. In this case, as an example, the signal ER6 may include information of an identifier corresponding to another local controller.

In operation S140, the ID checker 320 may output the signal ER5 to the error detector 330.

In operation S150, the error detector 330 may receive the signal ER5 from the ID checker 320. The error detector 330 may provide error information requested by the host 10 to the package generator 340 in response to the signal ER5. As an example, the error detector 330 may store error information obtained in real time, and may generate a signal EI including error information in response to the data of the signal ER5. The error detector 330 may output the generated signal EI to the package generator 340.

In operation S160, the package generator 340 may generate package data including error information based on the signal EI. The package generator 340 may generate a signal EIP including the package data to be generated. The package generator 340 may output the generated signal EIP to the MUX 350.

In operation S170, the MUX 350 may transmit the signal EIP to the transmitter 360. The transmitter 360 may output the signal EIP to the central controller 110 or another local controller. As the signal EIP is outputted by the transmitter 360 as the signal ER6, the local controller 300 may output a signal ER6 indicating error information. That is, when the identifier of the signal ER5 matches the identifier stored in the ID checker 320, the local controller 300 may output the signal ER6 indicating the error information of the IP corresponding to the local controller 300 by operation S110, operation S120, and operations S140 to S180.

FIG. 6 is a conceptual diagram illustrating example package data represented by the signals of FIG. 4.

Referring to FIG. 6, the package data included in the signal ER5 may include data "ID" indicating an identifier and data "opcode" and data "wdata" for requesting error information of the IP. As an example, the data "opcode" may be related to requesting whether an error occurs in the IP, and the data "wdata" may be related to requesting the type of error occurring in an IP. The ID checker 320 may compare the data "ID" of the signal ER5 with the identifier stored in the ID checker 320.

The error detector 330 may provide error information of the IP connected to the local controller 300 in response to the data "opcode" and "wdata" of the signal ER5. As an example, the error detector 330 may provide error information related to whether an error occurs in the IP in response to the data "opcode". The error detector 330 may provide error information related to the type of error occurring in the IP in response to the data "wdata".

The example package data represented by the signal EIP may include data "ID" indicating an identifier and data "rdata/wrep" indicating error information. The package generator 340 may generate data "rdata/wrep" indicating error information based on the signal EI.

FIG. 7 is a block diagram illustrating the configuration of an SoC according to an embodiment of the inventive concept.

Referring to FIG. 7, the SoC 1000 may include a central controller 1100, local controllers 1210 to 1260, and an NoC 1300. The NOC 1300 may include IPs 1310 to 1360. The IPs 1310 to 1360 may include network interfaces 1311 to 1361, respectively.

The SoC 20 of FIG. 1 may include the SoC 1000 of FIG. 7. The administrator network 100 of FIG. 1 may include a central controller 1100 and local controllers 1210 to 1260. The configuration and operations of the central controller 1100 of FIG. 7 are similar to those of the central controller 110 of FIG. 2, so that their descriptions are omitted below. The configuration and operations of the central controller 1100 of FIG. 7 are similar to those of the local controllers 121 to 123 of FIG. 2, so that their descriptions are omitted below.

As described with reference to FIG. 3, the central controller 1100 and the local controllers 1210 to 1260 may form an administrator network. For example, the central controller 1100 and the local controllers 1210 to 1260 may form a ring structure topology. The central controller 1100 and the local controllers 1210 to 1260 may transmit signals sequentially and unidirectionally.

The signal outputted from the central controller 1100 may include package data for debugging one of the IPs 1310 to 1360 connected to the local controllers 1210 to 1260. As the SoC 1000 is operated by the user, error detectors inside or outside the local controllers 1210 to 1260 may monitor the operations of the IPs 1310 to 1360. If an error occurs in at least one of the IPs 1310 to 1360, the error detectors may obtain and store error information related to the occurring error. The error detectors may provide error information in response to the package data included in the signal outputted from the central controller 1100. The error information may be transmitted to the central controller through at least one of the local controllers 1210 to 1260.

As an example, in response to a signal outputted from the central controller 1100, the local controllers 1210 to 1260 may sequentially output signals, and signals outputted from the local controller 1260 may be received by the central controller 1100. A signal outputted from the local controller 1260 to the central controller 1100 may indicate error information of one of the IPs 1310 to 1360. As an example, the signal outputted from the local controller 1260 to the central controller 1100 may include package data indicating error information of one of the IPs 1310 to 1360.

The local controllers 1210 to 1260 may communicate with the IPs 1310 to 1360 through the network interfaces 1311 to 1361, respectively. For example, the network interfaces 1311 to 1361 may process signals exchanged between the local controllers 1210 to 1260 and the IPs 1310 to 1360 depending on at least one of protocols such as Advanced Extensible Interface (AXI), Advanced High-performance Bus (AHB), Advanced Peripheral Bus (APB), and Open Core Protocol (OCP).

Since the SoC 1000 includes the central controller 1100 and the local controllers 1210 to 1260, which are configured to debug the NoC 1300, the designer of SoC 1000 may debug errors for the design of NoC 1300 without additional logic. That is, the designer of the SoC 1000 may easily debug the NoC 1300 without including additional hardware or software (e.g., a logic analyzer, etc.) and performing simulation (e.g., Register Transfer Level (RTL) simulation, gate level simulation, and back-annotate timing simulation).

According to the embodiment of the inventive concept, an SoC may be provided to easily debug an error that occurs in the process of designing an IP.

Although the example embodiments of the inventive concept have been described, it is understood that the inventive concept should not be limited to these example embodiments but various changes and modifications may be made by one ordinary skilled in the art within the spirit and scope of the inventive concept as hereinafter claimed.

What is claimed is:

1. A system-on-chip comprising:
 a central controller configured to, in response to a request from a host, generate a first signal for requesting error information, the error information being related to an error associated with a target semiconductor chip design; and
 a local controller configured to generate a second signal including the error information of the target semiconductor chip design, when the request from the host is determined to be related to the target semiconductor chip design based on the first signal,
 wherein the central controller is further configured to transmit the error information of the target semiconductor chip design to the host based on the second signal, and
 wherein the local controller comprises an identifier checker configured to determine whether or not an identifier included in the first signal matches an identifier stored in the identifier checker or assigned to the local controller.

2. The system-on-chip of claim 1, further comprising a network-on-chip including the target semiconductor chip design,
 wherein the local controller is configured to communicate with the target semiconductor chip design of the network-on-chip.

3. The system-on-chip of claim 2, wherein the network-on-chip further comprises a network interface for communication between the target semiconductor chip design and the local controller,
 wherein the local controller is further configured to obtain the error information of the target semiconductor chip design from the target semiconductor chip design through the network interface.

4. The system-on-chip of claim 1, wherein the first signal comprises information of an identifier,
 wherein the local controller is configured to determine whether the request from the host is for the target semiconductor chip design.

5. The system-on-chip of claim 4, wherein the local controller is configured to receive the error information of the target semiconductor chip design obtained from the target semiconductor chip design when the identifier of the first signal matches the stored or assigned identifier.

6. The system-on-chip of claim 1, wherein the error information relates to whether the error occurs in the target semiconductor chip design.

7. The system-on-chip of claim 1, wherein the error information relates to a type of the error occurring from the target semiconductor chip design.

8. The system-on-chip of claim 1, further comprising:
- an error detector coupled to the identifier checker, configured to receive the first signal from the identifier checker and, based on the first signal, to provide a signal containing the error information requested by the host to a package generator; and
- a package generator configured to, based on the signal containing the error information, generate package data including the error information.

9. The system-on-chip of claim 8, further comprising:
- a transmitter configured to output the error information to the central controller or another local controller; and
- a multiplexer configured to receive the first signal and a signal containing the package data, and in response to the identifier checker determining that the identifier included in the first signal matches the identifier stored in the identifier checker, output the package data including the error information to the transmitter.

* * * * *